United States Patent [19]

Martin

[11] Patent Number: 4,850,015

[45] Date of Patent: Jul. 18, 1989

[54] VEHICULAR STEERING WHEEL TELEPHONE APPARATUS

[76] Inventor: Gary Martin, 12213 Bristow Rd., Bristow, Va. 22013

[21] Appl. No.: 113,052

[22] Filed: Oct. 27, 1987

[51] Int. Cl.$^4$ ............................................. H04M 1/23
[52] U.S. Cl. ..................................... 379/428; 379/58; 455/89
[58] Field of Search .................. 379/56, 58, 63, 59, 379/60, 428, 424; 455/88, 89; 381/86; 200/DIG. 39, 61.54; 74/484 R

[56] References Cited

U.S. PATENT DOCUMENTS

| | | | |
|---|---|---|---|
| 4,455,452 | 6/1984 | Umebayashi | 379/63 X |
| 4,698,838 | 10/1987 | Ishikawa et al. | 379/56 X |
| 4,729,254 | 3/1988 | Nogami et al. | 74/484 R |

FOREIGN PATENT DOCUMENTS 54-01972 1/1979 Japan .

Primary Examiner—Jin F. Ng
Assistant Examiner—Randall S. Vaas
Attorney, Agent, or Firm—Leon Gilden

[57] ABSTRACT

A vehicular steering wheel telephone apparatus is set forth wherein a centrally mounted telephone unit is positioned medially of a vehicle-type steering wheel. Positioned in overlying relationship to said telephone unit is a pair of voice receiving speakers. In underlying relationship to said telephone unit is a pair of voice transmitting microphones. An overlying pivotal closure releases the telephone for use by releasing a switch hook exposing the telephone unit for operation. Optionally, a switching means is available for switching the receiving speakers for utilization with automobile stereo speakers.

6 Claims, 1 Drawing Sheet

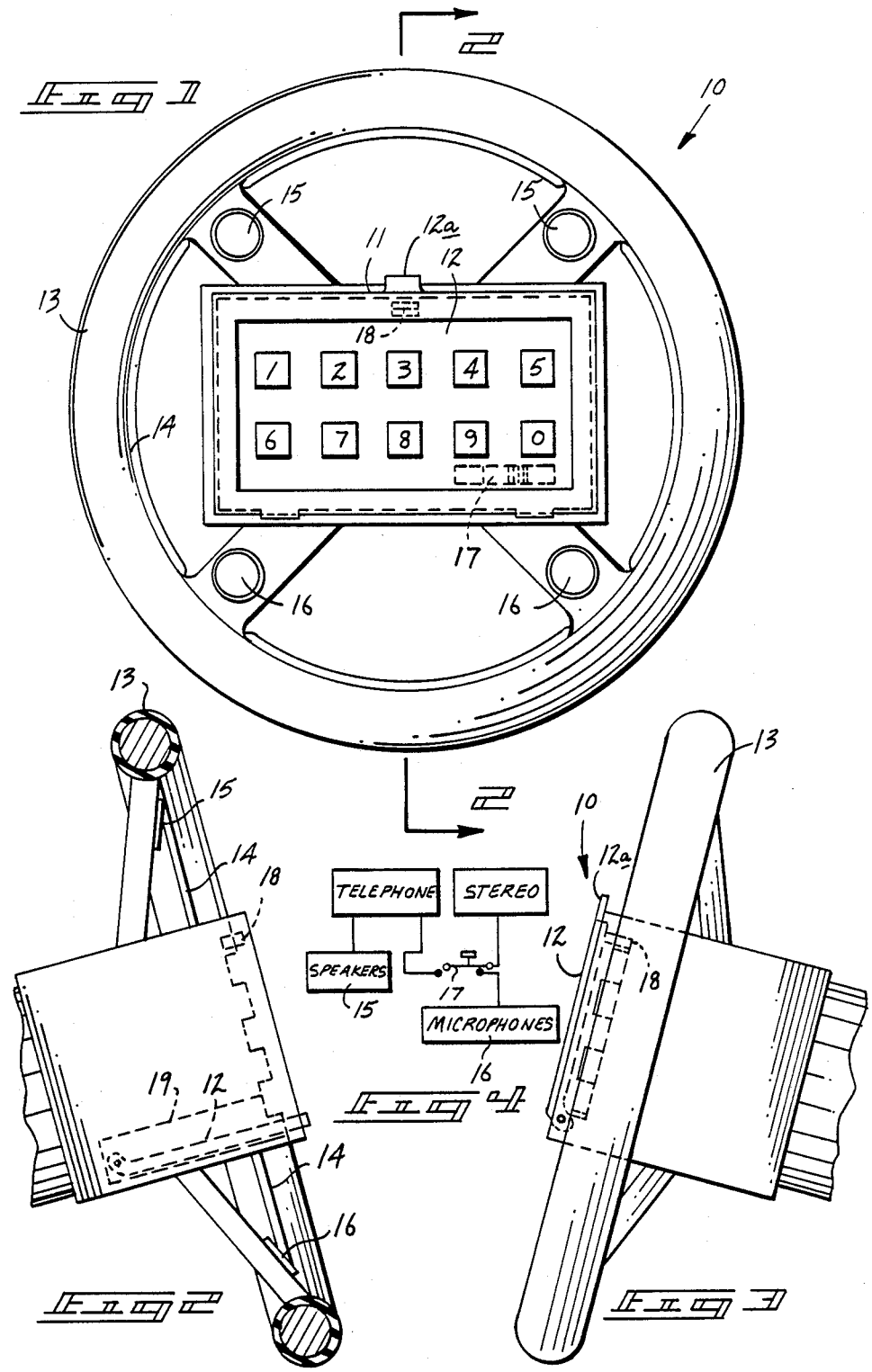

VEHICULAR STEERING WHEEL TELEPHONE APPARATUS

BACKGROUND OF THE INVENTION

1. Field of the Invention

The present invention relates to telephone units and more particularly pertains to a new and improved telephone unit formed in operative relationship to a vehicular steering wheel.

2. Description of the Prior Art

The use of telephones in operative relationship with vehicles and the like is well known in the prior art and is becoming more desirable as a convenience of contemporary life styles. As may be appreciated, the use of telephones within an automobile can be an awkward and burdensome experience due to the remoteness of the telephone and the need to use same while operating a motor vehicle. Adding to the cumbersome nature of automobile telephones is the danger of removing one's eyes from the driving environment in response to a telephone ringing creating potentially hazardous driving conditions. Accordingly, the need for providing a telephone unit in operative relationship to a major automotive control unit, such as a steering wheel, becomes not only a convenience but a safety measure as well. In this connection, telephones are well known in the art and steering wheel accessories are well known in the art, but the combination of the two in a synergistic relationship has heretofore not been set forth. U.S. Pat. No. Des. 159,237 to Steadman illustrates the use of a clip-on transitory tray as an adjunct attachment removably secured to an associated steering wheel.

U.S. Pat. No. Des. 184,411 illustrates the use of a telephone holder and note receptacle.

U.S. Pat. No. 4,527,018 to Offredi illustrates a bracket for supporting a telephone with means providing an abutment to operate a switch hook of the associated telephone unit wherein additionally the support bracket may become part of an intercom unit or switchboard. The functional relationship of the bracket and various other components bears little relationship to the operative association of the instant invention.

U.S. Pat. No. Des. 276,037 illustrates a housing associated with a steering wheel for ornamental purposes.

It may be appreciated that there is a continuing need for providing a telephone conveniently and effectively operatably associated with the dynamics of stimulative driving. The need to provide such an operative relationship is necessary in minimizing the dangers and difficulty in utilizing a telephone in contemporary settings of traffic and various distractions during the course of driving an automobile. In this respect, the present invention substantially fulfills this need.

SUMMARY OF THE INVENTION

In view of the foregoing disadvantages inherent in the known types of vehicle telephone apparatus now present in the prior art, the present invention provides an vehicle telephone apparatus wherein the telephone is integrally secured in an operative relationship to an associated vehicle steering wheel to enable usage of the telephone while maintaining concentration on the duties associated with vehicular operation. As such, the general purpose of the present invention, which will be described subsequently in greater detail, is to provide a new and improved vehicular steering wheel telephone apparatus which has all the advantages of the prior art vehicle telephone apparatus and none of the disadvantages.

To attain this, the present invention comprises a telephone sending and receiving unit positioned medially of a vehicle steering wheel with associated listening speakers and broadcasting microphones for usage by an operator. Optionally, switching means may be available to enable switching of the listening speakers to include those associated with a vehicle stereo system to operate in concert with the aforenoted telephone system.

My invention resides not in any one of the these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular telephone which has all the advantages of the prior art vehicular telephones and none of the disadvantages.

It is another object of the present invention to provide a new and improved vehicular telephone which may be easily and efficiently manufactured and marketed.

It is a further object of the present invention to provide a new and improved vehicular telephone which is of a durable and reliable construction.

An even further object of the present invention is to provide a new and improved vehicular telephone which is susceptible of a low cost of manufacture with regard to both materials and labor, and which accordingly is then susceptible of low prices of sale to the consuming public, thereby making such vehicular telephone economically available to the buying public.

Still yet another object of the present invention is to provide a new and improved vehicular telephone which provides in the apparatuses and methods of the prior art some of the advantages thereof, while simultaneously overcoming some of the disadvantages normally associated therewith.

Still another object of the present invention is to provide a new and improved vehicular telephone apparatus wherein the telephone is operatively and integrally associated with a steering wheel of the associated vehicle.

Yet another object of the present invention is to provide a new and improved vehicular telephone apparatus wherein the listening speakers and the broadcasting microphones are integrally associated with the steering wheel.

Even still another object of the present invention is to provide a vehicle telephone apparatus wherein an optional switching means is available to enable switching of the receiving speakers to include operative association with radio speakers within the automobile.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic top view of the instant invention illustrating the relationship of the telephone dialing apparatus, the listening speakers and the broadcasting microphones.

FIG. 2 is an orthographic side view of the instant invention taken along the lines 2—2 of FIG. 1 in the direction indicated by the arrows.

FIG. 3 is an orthographic side view of the instant invention illustrating the pivoting covering flap in a forwardmost position.

FIG. 4 is a diagramatic illustration of the optional switching mechanism to enable selective association of the listening speakers to the telephone apparatus or the vehicle's stereo system.

DESCRIPTION OF THE PREFERRED EMBODIMENT

With reference now to the drawings, and in particular to FIG. 1 thereof, a new and improved vehicular steering wheel telephone apparatus embodying the principles and concepts of the present invention and generally designated by the reference numeral 10 will be described.

More specifically, it will be noted that the vehicular steering wheel telephone apparatus 10 essentially comprises a conventional telephone secured within a housing 11 which includes listening speakers 15 positioned in an overlying relationship to housing 11 on conventional steering wheel spokes. Associated broadcasting or transmitting microphones 16 are accordingly positioned in an underlying relationship to housing 11 on a further pair of steering wheel spokes. While pairs of speakers and microphones are illustrated, it is to be understood a single speaker and microphone may be utilized. Pairs of said speakers 15 and microphones 16 are preferred, however, to enable ease of broadcast and reception in telephone usage to overcome background noise normally associated with vehicular operation.

A clear overlying retractable lid 12 is formed with an extending lip 12a to enable manual manipulation of lid 12 to effect retraction of said lid within a lid cavity 19. The telephone apparatus is integrally and operatively associated with a conventional vehicle steering wheel 13 provided with horn-ring segments 14 for affecting operation of the vehicle's horns in as much as the telephone apparatus is centrally positioned, as illustrated in FIG. 1. The telephone switch hook 18 is positioned proximate a forwardmost portion of lid 12, as illustrated in 18, whereby the switch hook is normally depressed, as is conventional with telephone switch hooks, and released when lid 12 is withdrawn and retracted within its respective cavity 19.

Of optional use for particular application in an automotive environment is a speaker switch 17 diagramatically illustrated in FIG. 4 whereupon stereo speakers, be the vehicle so equipped, may be switched to receive signals along with the conventional telephone speakers 15 thereby enabling a greater number of individuals to listen in on the conversation, if so desired, and furthermore allow a user greater ease of participation in a conversation should exterior noises in vehicle operation become consequential.

As to the manner of usage and operation of the present invention, the same should be apparent from the above description. Accordingly, no further discussion relative the manner of usage and operation will be provided.

With respect to the above description then, it is to be realized that the optimum dimensional relationship for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principle of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A combination vehicular telephone and steering wheel apparatus for use in vehicles comprising,
    a telephone case including a push-button dialing telephone integrally secured to said steering wheel, and
    microphone transmitting means for transmitting voice communication secured to said steering wheel remote from said case, and
    speaker receiver means for broadcasting received voice communication secured to said steering wheel remote from said case, and
    pivotally mounted lid means secured to said case for depressing a switch hook associated with said telephone in a first position and releasing said switch hook when pivoted to a second position, and
    wherein said lid means is pivotally retractable within a cavity formed within said case, and wherein the lid means in said first position is substantially parallel to a plane defined by a perimeter of said steering wheel and substantially perpendicular with respect to said perimeter when in said second position.

2. A combination vehicular telephone and steering wheel apparatus as set forth in claim 1 wherein when said telephone case includes a speaker switch means to selectively include radio speakers for broadcasting received voice communications.

3. A combination vehicular telephone and steering wheel apparatus as set forth in claim 2 wherein said telephone case is centrally positioned with respect to the perimeter of said steering wheel to facilitate access to said telephone case.

4. A combination vehicular telephone and steering wheel apparatus as set forth in claim 3 wherein said steering wheel includes vehicular horn actuation ring segments positioned about said perimeter.

5. A combination vehicular telephone and steering wheel apparatus as set forth in claim 4 wherein said speaker means are integrally secured to said steering wheel above said case, and said microphone means is positioned below said case and integrally secured to said steering wheel.

6. A combination vehicular telephone and steering wheel apparatus as set forth in claim 5 wherein said microphone means includes at least two microphone units and said speaker means includes at least two speaker units.

* * * * *